United States Patent [19]

Dost et al.

[11] Patent Number: 4,600,272
[45] Date of Patent: Jul. 15, 1986

[54] MOUNTING ARRANGEMENT FOR OPTICAL COMPONENTS

[75] Inventors: Willibald Dost, Munich; Kurt Habenschaden, Eichenau; Hans Kreutzer; Günter Wasner, both of Munich, all of Fed. Rep. of Germany

[73] Assignee: Siemens Aktiengesellschaft, Berlin and Munich, Fed. Rep. of Germany

[21] Appl. No.: 714,403

[22] Filed: Mar. 21, 1985

[30] Foreign Application Priority Data

Apr. 27, 1984 [DE] Fed. Rep. of Germany ....... 3415853

[51] Int. Cl.$^4$ ............................ G02B 7/18; G02B 7/02
[52] U.S. Cl. ..................... 350/287; 350/631; 350/252
[58] Field of Search ............... 350/287, 631, 252, 253, 350/590, 321, 107, 108; 248/201, 618

[56] References Cited

U.S. PATENT DOCUMENTS

| 1,285,775 | 8/1915 | Mihalyi | 350/287 |
| 2,435,908 | 2/1948 | Tinnerman | 350/252 |
| 2,477,705 | 8/1949 | Sweet | 350/252 |
| 2,552,938 | 5/1951 | Cojan | 350/287 |
| 2,780,142 | 2/1952 | Bouwers | 350/287 |

FOREIGN PATENT DOCUMENTS

| 281626 | 1/1915 | Fed. Rep. of Germany | 350/287 |
| 285116 | 6/1928 | Fed. Rep. of Germany | 350/287 |
| 3130420 | 3/1983 | Fed. Rep. of Germany | |

Primary Examiner—Jon W. Henry
Attorney, Agent, or Firm—John F. Moran

[57] ABSTRACT

For easy durable and safe fastening of an optical element (2) (e.g.: a reflector-mirror), without affecting ambient cleanliness, a cup-shaped frame (1) is provided, in whose depressed hollowed-out area (6) the optical element is embraced and thus laterally secured, while a spring leg (3) is provided as a fixing element, exerting a compressional force on the optical element. In this way, a threadless, cementless/plasterless fastening is realized. The invention is generally suitable for fastening optical elements, particularly a mirror or a totally reflecting prism of an optical resonator.

9 Claims, 2 Drawing Figures

MOUNTING ARRANGEMENT FOR OPTICAL COMPONENTS

BACKGROUND OF THE INVENTION

This invention relates to a fastening mount for optical elements, such as a reflector mirror or prism, suitable for use in a beam path, for example, in an optical resonator, and, more particularly it relates to a fastening mount involving a cup-shaped frame on whose bottom there is an aperture for the beam path. The internal side of the bottom has also a hollowed out depression so that the optical element is locked in position from the sides by the walls of the depression, and in the direction of its optical axis by a fixing element pushed into the frame.

A familiar fastening mount is disclosed in German Patent No. DE-OS 3,130,420, for optical elements or components, particularly for a reflector mirror of a laser resonator. In this type fastening mount the optical element can be easily installed and changed, and in many applications it is reliably secured in position. Additionally required in the jointing area between the threaded grip and the optical element are suitable pressing and sealing compounds. The fastening mount therefore involves several items in the jointing area. Moreover, in the case of mounting arrangements where the jointing requires threading or, for instance, cementing/plastering, there is a risk of impurities penetrating into the space surrounding the optical element; such fastening mounts are therefore less suitable for certain applications where maintenance of rigorous cleanliness is strictly necessary (e.g.: in the case of gas lasers). Furthermore, thread mounts are likely to become loose or undone altogether, especially when used in mobile applications.

SUMMARY OF THE INVENTION

An object of the invention is to provide a permanent and secure mounting arrangement for an optical element which maintains these characteristics during the vibration and jarring experienced in mobile applications.

Another object of the invention is to provide a fastening amount of the type previously described, that permits convenient assembly and disassembly of the optical element, easier construction, and universal applicability, independent of ambient or operating conditions, as well as permanent and secure grip on the optical element.

According to the inventive principles, a fastening mount having numerous applications is provided by a frame with a circular, inside-projecting, and intermittent peripheral rim around the side of the wall, sheltering an undercut. The fastening element comprises a U-sectional or cup-shaped spring, whose lateral spring legs engage in the undercut and whose bottom, which is positioned by the spring legs, exerts a compressional force on the optical element.

In an illustrative fastening mount, according to the invention, the optical element is designed to fit in the hollowed out depression of the frame bottom, locking it in position from the sides with satisfactory precision. The optical component mounted is locked in the direction of its optical axis with the help of a spring, inserted into the cavity created between the rim and the frame bottom, so that the spring legs engage into the undercut. The spring bottom thus exerts a compressional force on the optical element, against the supporting area of the depression. Only a single fastening element, a spring, is thus necessary in addition to the particular shape of the frame to secure the optical element in position.

The result is a simpler structure of the fastening mount, which is now feasible with a single piece in the jointing area. The spring provides a permanent and secure fastening on the optical element, which is thus appropriate for mobile application in arrangements using fastening mounts according to the invention. Furthermore, the spring is threadless and obviates the use of plaster/cement compounds so that fastening mounts according to the invention is ideally suited in applications wherein a high degree of cleanliness is required around the optical element. As a result, the fastening mount according to the invention is universally applicable, independent of ambient and operating conditions. Moreover, a fastening mount involving a single fixing element, a spring, permits easy and convenient assembly and disassembly.

An advantageous version of the fastening mount according to the invention uses a cup-shaped spring, whose legs are created by several slits originating from the periphery of the cup. The spring can thus readily adapt to the shape of the frame.

In order to achieve maximum spring securing action in fastening mounts according to the invention, it is advantageous for the spring bottom to include an aperture with at least one pair of spring tongues facing one another.

For easy disassembly of a fastening mount according to the invention, it is useful to notch the rim of the frame and the internal side of the frame itself by providing depressions accessible from the free frontal side of the wall. Through these depressions legs can be pushed in with the aid of a suitably shaped tool, so that the spring can be easily taken out of the cavity. As regards the use of the fastening mounts according to the invention, particularly where strict cleanliness conditions are required, it is useful to close the open side of the frame with a tight covering plate. Such a cover could be advantageously welded or soldered on the frame rim.

BRIEF DESCRIPTION OF THE DRAWING

Further object, additional advantages and features of the invention will become apparent upon readiing the following detailed description in conjunction with the drawing which.

DETAILED DESCRIPTION

Figure 1:
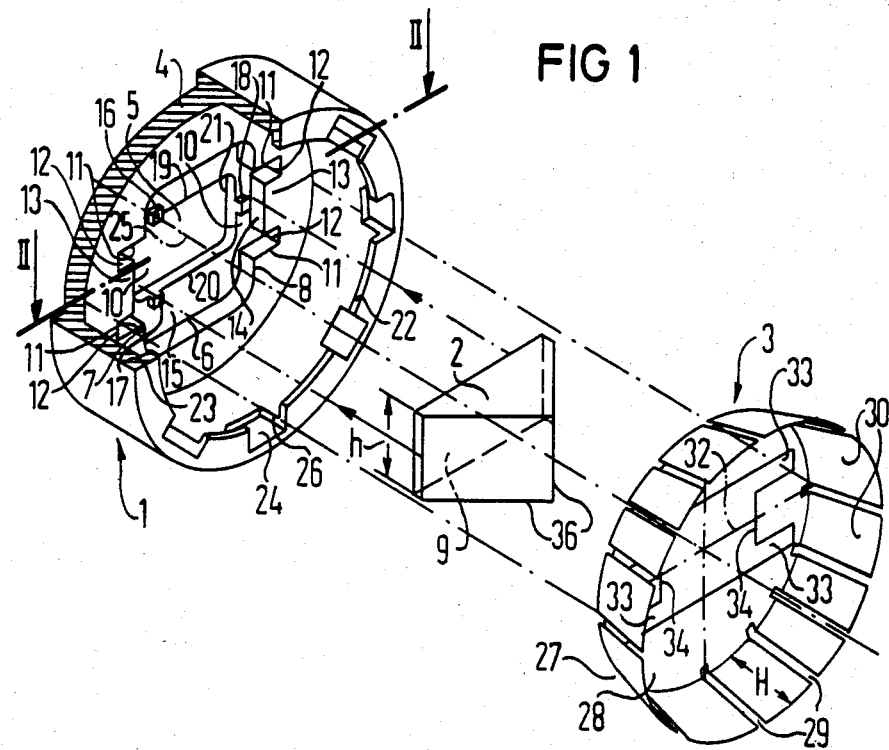
FIG. 1 depicts an exploded perspective view of the fastening mount and its individual components.
Figure 2:
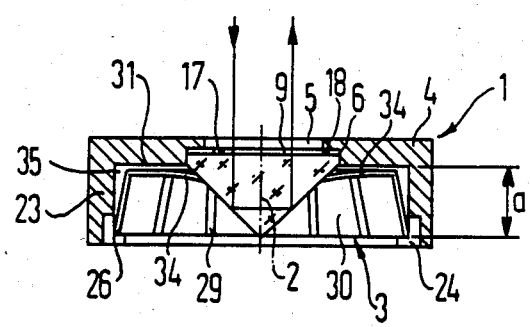
FIG. 2 illustrates a cross-sectional view along center line II—II of FIG. 1.

The fastening mount consists of a frame 1 designed to receive an optical component 2, exemplified here by a deflecting prism, and a fixing element 3, which locks or secures the optical element in the frame. Frame 1 is represented here as circular, cup-shaped, and designed to be, for example, a component of an optical-resonator casing (e.g.: for a gas laser). In the present example, the bottom 4 of the frame has a rectangular aperture which lines up with the beam path. In order to receive the optical element 2, the internal side of the frame bottom has a hollowed-out depression 6, also essentially rectangular, with rounded corners. Two opposite sides 7, 8 of the depression 6 are set back over a fraction 10 of their length (corresponding to the height h of the rectangular base 9 of the optical element) so that the element introduced into the depression 6 is tightly embraced by the frontal surfaces 14 and the steps 11 and is satisfactorily locked to present lateral movement. As the rectangular base 9 of the optical component has sharp edges, additional recesses 12 are provided between the frontal surfaces 14 and the corresponding steps 11, as shown in FIG. 1. This provides protruding shoulders 13, whose frontal surfaces 14 are set back from the lateral walls 7 and 8 of the depression.

In order to support the rectangular base 9 of the optical component 2 in the hollowed out area, the base 15 is provided with three raised, finely finished bearing blocks 16, 17 and 18 which are arranged on the edge of the aperture 5 at the angles of an equilateral triangle. Blocks 16 and 17 are thus facing each other from the parallel long sides 19 and 20 of aperture 5, while the third block 18 borders the short side 21. In this way, the position of the optical component in the path of the beam is established with a high degree of precision.

Frame 1, designed to receive and hold the optical element, presents a circular rim 22 protruding to the inside from the free frontal side of the wall. Both rim 22 and frame-wall 23 have depressions 24 starting from the free frontal side wall—which are thus accessible from this direction—and running parallel to the central axis 25 of the frame. Rim 22 shelters an internal peripheral undercut 26 created by the translation from rim to wall 23, permitting the positioning of spring element 3. The spring element in a fastening mount according to the invention includes a U-sectioned spring with spring legs enclosing the bottom. In the described the spring includes a cup-shaped circular element, whose outside diameter fits into the inside diameter of the frame. The lateral surface 27 of the spring 3 is conically tapered toward bottom 28 and is divided into individual spring legs 30 by slits 29 parallel to one another and to the central axis 25, and preferably distributed uniformly around the periphery. The spring legs height H is approximately equal to, or less than, the distance a between the undercut 26 and the internal side 31 of the frame bottom 4. The spring bottom 28 has an essentially rectangular aperture 32 whose short side project two spring tongues 34 facing each other. The tongues are created by slits 33. In order to fasten the optical component 2 in the depression 6 of the frame 1, the spring 3 is pushed into its intended position, i.e., into the cavity 35 created between the frame bottom 4 and the rim 22, so that the spring recess 32 coincides with the frame aperture 5. When spring 3 is pushed into cavity 35, spring legs 30 engage into undercut 26, behind frame rim 22. In the process the spring tongues 34 of the spring bottom are bent over the lateral surfaces 36 of the optical element and exert a compressional force on the optical element against the bearing blocks 16, 17 and 18. The optical element is now locked also against movement in the direction of its optical axis. In order to loosen this fastening action when extracting the optical element, depressions 24 are spacially distributed around the periphery of cavity 35 behind each spring leg 30. Only a few of these depressions are illustrated in FIG. 1. A special tool may be inserted into the depressions to press the spring legs toward the inside so that spring 3 may be extracted from cavity 35. For this purpose it is sometimes necessary first to remove a plate (not represented here in more detail), which may have been provided for covering and sealing cavity 35 of the fastening mount according to the invention, especially when strict requirements are formulated concerning maintenance of cleanliness around the optical element. The covering plate can be attached (e.g.: by welding) to rim 22 of the frame.

Optical elements other than those mentioned above (e.g. plane mirrors) can be secured in the frame with the help of fastening mounts according to the invention. In the case of a plane mirror, the approach of a cup-shaped spring is highly applicable and may be readily used to advantage. However, there are also other imaginable shapes of leg springs, suitably modeled into U-sections adapted to the respective optical element. It is to be understood that those skilled in the art may devise numerous and varied other changes to the illustrative embodiment herein described. Accordingly such changes are within the spirit and scope of the invention which is only limited by the following claims.

What is claimed:

1. A fastening mount for optical elements suitable for use in the path of a light beam, the fastening mount comprising: a cup shaped frame having a cylindrical wall and a bottom at the base of the cylindrical wall, the bottom including an aperture coincident with the path of the light beam wherein the internal side of the bottom has a hollowed out depression adapted to accept the optical element side walls of the depression for securing the optical element in position, a fastening component adapted to be pushed into the frame in the direction of an optical axis corresponding to the path of the light beam, the frame having a circular inside-projecting and intermittent peripheral rim located at the top of the cylindrical wall, sheltering an undercut, and the fastening component comprising a U-sectioned spring having a base portion and lateral legs adapted to engage in the undercut and the base portion is peripherally ringed by the lateral legs of the spring to provide a compressional force on the optical element for securing it in the depression.

2. A fastening mount according to claim 1, wherein the spring comprises a cup-shaped part whose lateral legs are formed by a plurality of slits on the periphery of said part.

3. A fastening mount according to claims 1 or 2, wherein the bottom of the spring has an aperture with at least one pair of spring legs projecting towards one another.

4. A fastening mount according to claims 1 or 2, wherein the lateral legs converge conically, tapering toward the bottom of the spring.

5. A fastening mount according to claim 2, wherein the height (H) of the lateral legs of the spring is approximately equal to, or less than, the distance (a) between the undercut and the internal side of the bottom of the frame.

6. A fastening mount according to claim 2, wherein the frame and spring are circular and the outside diameter of the spring fits into the inside diameter of the frame.

7. A fastening mount according to claim 2, wherein the peripheral rim of the frame including the frame itself, have a plurality of depressions on the inside of the cylindrical wall, which are accessible from a side of the frame corresponding to that of the top of the cylindrical wall.

8. A fastening mount according to claim 2, wherein the hollowed out depression of the frame includes three finely finished bearing blocks located to correspond to the vertices of an equilateral triangle.

9. A fastening mount according to claim 2, wherein a covering plate is fastened to the side of the frame corresponding to that of the top of the cylindrical wall for enclosing the optical element in the frame.

* * * * *